July 7, 1936.  M. BETKE  2,046,542

AUTOMATIC RAIL JOINT FASTENING

Filed Aug. 14, 1934

Inventor:
Michael Betke:
By Homer Sweet
Attorney.

Patented July 7, 1936

2,046,542

UNITED STATES PATENT OFFICE 2,046,542

AUTOMATIC RAIL JOINT FASTENING

Michael Betke, Aurora, Colo.

Application August 14, 1934, Serial No. 739,740

6 Claims. (Cl. 238—260)

This invention relates to rail joints, and more particularly to that type of rail joint arranged and equipped for automatic tightening of the joint bolts through the agency of devices adapted to be acted upon by wheels passing over said joint, and has as an object the provision of improved means automatically operable to maintain a joint bolt and its nut in tightly clamping relation with the joint elements.

A further object of the invention is to provide an automatic joint bolt tightening device which is simple and inexpensive of manufacture and installation and positive and efficient in operation.

Practice has demonstrated that the bolts of rail joints, however well tightened and locked originally, will eventually loosen under the effects of vibration and temperature change constantly acting on such joints, which loosening may not result from turning of the nut relative to the bolt but from stretching of the bolt, improved contact between meeting surfaces, or other causes. Loose bolts in rail joints are highly objectionable and, if uncorrected, may lead to disaster, hence the necessity for frequent joint inspection and manual tightening of the loose bolts thus found, which is the common, though expensive, practice. Loose joint bolts are also destructive of rails and roadbed, since a loose joint permits disalignment of abutting rail ends and vertical motion therebetween under traffic thereover with consequent battering and deformation of the rail butts and pounding of the roadbed, both of which conditions may be obviated through the use of the devices comprised in this invention, whereby the joint bolts are automatically kept tight to insure a rigid joint wherein there is no play.

My invention consists in the construction, arrangement and combination of elements hereinafter set forth, pointed out in my claims and illustrated by the accompanying drawing, in which—

Figure 1:
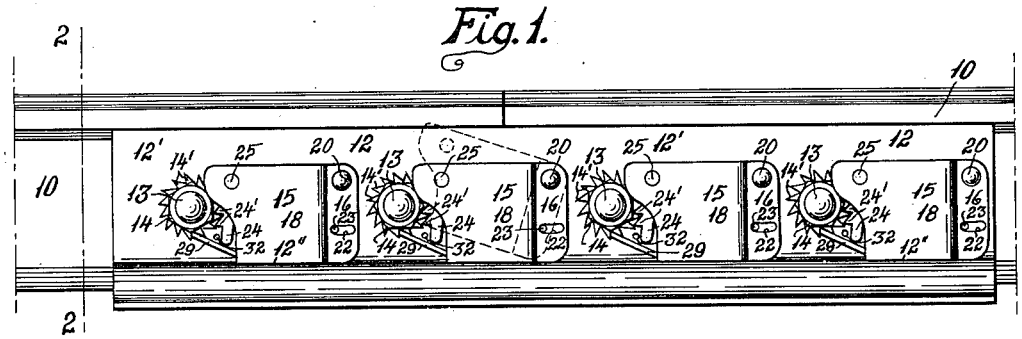
Figure 2:
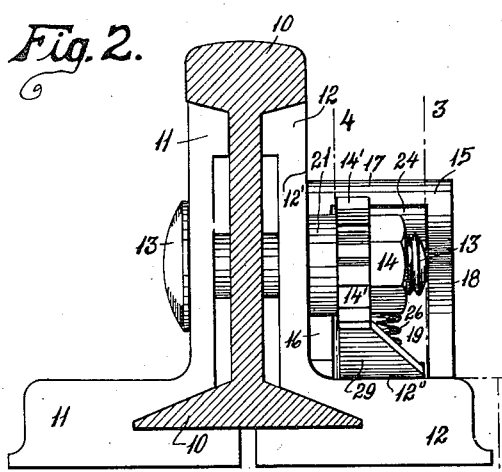
Figure 3:
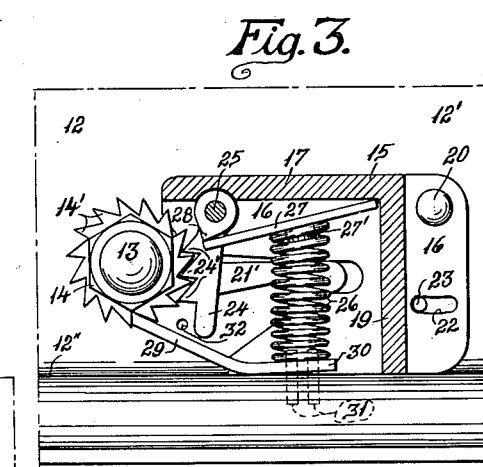
Figure 4:
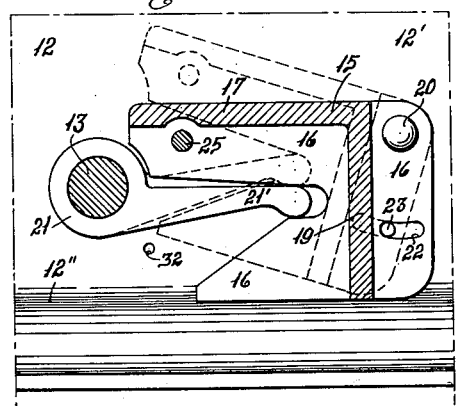
Figure 5:
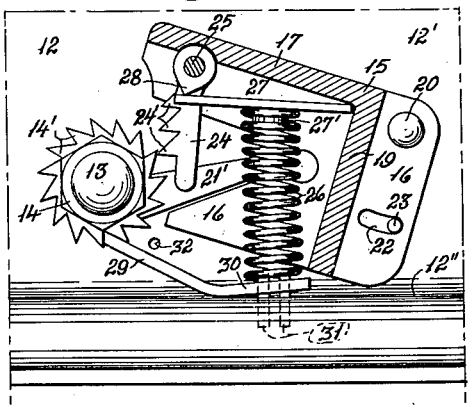

Figure 1 is a side elevation of portions of abutting rails forming a joint to which my invention has been applied, dotted lines in said figure indicating an alternative position of one of the bolt tightening units. Figure 2 is a cross section on the indicated line 2—2 of Figure 1 and on an enlarged scale relative thereto. Figure 3 is a fragmentary, detail section on the indicated line 3—3 of Figure 2. Figure 4 is a fragmentary, detail section on the indicated line 4—4 of Figure 2. Figure 5 is a view similar to Figure 3 showing the elements of said latter figure in an alternative position.

In the construction of my improvement as shown, the numeral 10 designates either portion of abutting railway rails, forming a joint. Fishplates 11, 12 are mounted on opposite sides of the rails 10 in overlapping relation with the joint and secured in splicing relation with said rails by means of bolts 13 engaging through registering holes in the fishplates 11, 12 and webs of the rails 10, nuts 14 engaging the threaded portions of said bolts being operable to firmly clamp the joint assembly together and prevent relative motion between the elements thereof, all of which is common and well-known practice. The fishplates 11 and 12 may have any suitable form, that shown being typical of a standard form in general use, but for the purpose of my invention it is desirable that the fishplate positioned against the inner or flange side of the rails, in this instance the fishplate 12, be arranged with a plane, substantially vertical face 12' coplanar with the adjacent margin of the head formed on the rails 10 and a plane, substantially horizontal surface 12'' formed on its base and extending laterally from the surface 12'. There may be any desired number of bolts 13 to each joint, four being commonly employed as illustrated in this instance, which bolts may be arranged in any suitable manner to prevent their rotation in and relative to the joint during tightening of the nuts 14, and must be mounted for purposes of this invention with their threaded ends extending through the fishplate 12 on the inner or flange side of the rails 10.

In the illustrated embodiment of my invention, a box-like unit 15, suitably formed of metal, is provided for each of the bolts 13, each of the units 15 comprising a substantially plate-like wall 16 adapted to lie against the surface 12' of the fishplate 12, a top or cover plate 17 fixed to or integral with the upper margin of the wall 16 and extending at substantially right angles therewith outwardly from the fishplate 12, a front wall 18 depending in spaced parallelism with the wall 16 from the outer margin of the plate 17 and an end wall 19 positioned inwardly from one end of the wall 16 and joining with said latter wall and corresponding margins of the elements 17 and 18 to close one end of the assembly. The units 15 are so proportioned as to permit of their being mounted on a fishplate 12 in the manner shown for independent operation as hereinafter described, lower margins of the elements 16, 18 and 19 normally resting on the surface 12" of the fishplate 12 to position the plates 17 in spaced parallelism with said surface and in clearing relation with and just beneath the path of travel of wheel flanges passing along the rails 10. The units 15 being identical in construction and operation, only one of said units will be further described. Each unit 15 is secured to the fishplate 12 and mounted thereon for actuation through a vertical arc relative thereto by means of a rivet or headed stud 20 engaging through and interconnecting the vertical web of said fishplate and an upper corner of that portion of the unit wall 16 projecting beyond the closed end of the unit assembly, said pivot element 20 being so located relative to the fishplate 12 as to position the open end of its unit 15 in somewhat overlapping relation with an adjacent nut 14, as is clearly illustrated in Figures 1, 3 and 5. The nut 14 is formed with a ratchet wheel base portion 14' adapted to bear against a relatively thick washer 21 loosely mounted on the bolt 13 between the fishplate 12 and nut 14 and firmly clamp the elements 10, 11, 12 and 21 together. An arcuate slot 22, concentric with the pivot 20, is formed in the projecting end portion of the wall 16 and is arranged for end engagement with a pin or stud 23 fixed in the fishplate 12 to limit arcuate travel of the unit 15 about its pivot. Just within the open end of the unit 15, a detent 24 is pivotally mounted on and depends from a pin 25 engaging transversely of said unit between the walls 16 and 18 thereof, said detent being thus positioned tangentially of the orbit of the ratchet wheel 14' so that teeth 24' formed on one margin of said detent may engage and mesh with the teeth of said ratchet wheel. While one tooth 24' is sufficient to operate the device successfully, the three such teeth illustrated are desirable for strength and efficient operation. Housed within the unit 15 intermediate the detent 24 and end wall 19, an expansive coil spring 26 is positioned with its pressure acting between the plate 17 of the unit and the base of the fishplate 12, the said spring thus acting to urge the open end of the unit upwardly into the position shown in Figure 5 and indicated by dotted lines in Figure 1. A plate-like clip 27 is interposed between the plate 17 and upper end of the spring 26 to directly receive the thrust of said spring, said clip being provided with a boss or stud 27' arranged to be received within the upper end of said spring to position the latter and being extended toward the open end of the unit 15 to terminate in a finger positioned beneath the pin 25 and bearing against a cam 28 formed on the mounting hub of the detent 24 in such manner as to utilize the pressure of the spring 26 to yieldingly urge said detent into meshing relation of its teeth with the teeth of the ratchet wheel at all times. In similar manner, a V-shaped pawl is formed with a longer arm 29 and a shorter arm 30 angularly interrelated, the shorter arm 30 being received between the lower end of the spring 26 and the base of the fishplate 12 and the longer arm 29 extending into ratcheting engagement with the teeth of the ratchet wheel 14', thus positioning the angle between said arms against the base of the fishplate 12 where it acts as a fulcrum through which the pressure of the spring 26 may act to urge the end of the longer arm 29 into close engagement with the ratchet teeth of the nut, the pawl thus operating to prevent unscrewing of said nut and yielding to permit tightening thereof. To position the V-shaped pawl and the lower end of the spring 26, pins or studs 31 rise from the base of the fishplate 12 in position to extend through suitable apertures formed in the arm 30 of said pawl and engage within the lower end of the spring 26, said elements 31 thus limiting displacement of said pawl and/or spring longitudinally of said fishplate. In order to interconnect the various elements of the invention for cooperation in maintaining the nuts 14 tight on their respective bolts, each washer 21 is formed with a relatively long arm 21' extending substantially radially therefrom along the fishplate surface 12' in intersecting relationship with the unit wall 16, which latter is provided with a V-shaped notch opening toward the washer 21 wherein said arm 21' is accommodated. The extremity of the arm 21' is rounded, as shown, and is closely received in a suitable notch formed at the apex of the V-notch, so that, when the nut 14 is firmly clamped against the washer 21, the arm 21' is held against actuation and in turn, through its engagement with the wall 16, inhibits actuation of the unit 15 about its pivot 20, any loosening of the nut 14 permitting actuation of said arm 21' and consequent extension of the spring 26 to elevation of the unit 15, the leverage resulting from the arrangement shown and described being such as to permit a relatively light spring to elevate the unit 15 when the nut 14 is but slightly loosened. To facilitate manual adjustment of the nut 14, a portion of the wall 18 is cut out, substantially as shown, so that when the unit 15 is in its raised position a suitable wrench may readily be applied to said nut. Since the detent 24 and pawl arm 29 must be moved out of engagement with the ratchet wheel 14' against the pressure of the spring 26 when the nut 14 is to be turned in unscrewing relation with the bolt 13, a hole or recess 32 is formed in the fishplate 12 between and adjacent said elements 24 and 29 wherein may be seated the end of a key or lever (not shown) operable to move the said elements out of engagement with the teeth of the ratchet wheel 14', when desired.

In the practical operation of my improvement, the elements being assembled and arranged as shown and described, it is readily apparent that when the bolt 13 and its nut 14 are in tightly clamping relation with the elements of the rail joint the pressure of said nut against the washer 21 will, through the arm 21', hold the unit 15 against any arcuate motion about its pivot, engagement of the pawl arm 29 with the ratchet wheel 14' locking said nut against loosening rotation. Should the bolt or nut become loosened in any manner sufficient to permit slight rotation of the washer 21, the pressure of the spring 26 will move the unit 15 through a vertical arc to the position shown in Figure 5, the detent 24 ratcheting against the pressure of said spring past the teeth of the ratchet wheel to its new position, the corner of the unit 15 being thus positioned adjacent the tread of the rail 10 in the path of travel of wheel flanges passing along said rail, the first of which flanges will engage said unit and move it downwardly, during which motion the teeth 24' of the detent will engage the ratchet wheel teeth and rotate the nut 14 in a tightening direction, this action being repeated by successive wheel flanges until the nut 14 is sufficiently tightened on its bolt 13 to clamp the washer 21 against rotation and thereby hold the unit 15 against the pressure of its spring 26, the arm 29 of the pawl ratcheting past the teeth of the ratchet wheel as the nut 14 is rotated and at all times preventing unscrewing of said nut. Due to the fact that the points on a wheel flange have a greater peripheral speed than points on the wheel tread, that portion of the flange engaging the unit 15 has a slight rearward travel relative to the wheel tread, which fact assures a downward wiping action between the flange and unit 15, irrespective of the direction of travel of the wheel, and minimizes impact effect on said unit. When a bolt 13 is broken or damaged so as to be no longer effective, the unit 15 will remain in elevated position after wheels have passed thereover and thus indicate the necessity of repair to the next track worker or inspector to pass that way. It is to be noted that but a single spring is employed to actuate the three operating elements, which spring is housed and protected for a long life of efficient operation. When the bolts of rail joints are thus automatically kept tight, low and battered joints cease to be a menace and the expense of track maintenance is notably reduced.

Since many changes in the specific construction, proportions and arrangement of the elements shown and described may be had without departing from the spirit of the invention, I wish to be understood as being limited solely by the scope of the appended claims rather than by any details of the illustrative showing and foregoing description.

I claim as my invention—

1. An automatic rail joint fastening comprising abutting rail sections, fishplates overlapping the joints thereof, bolts extending through said rails and fishplates, ratcheted nuts on said bolts, an operating device pivoted at one end for actuation of its free end through a limited vertical arc adjacent each of said nuts and arranged to tighten its respective nut during downward travel of the free end of said device, resiliently yieldable means normally urging the free end of said operating device toward the upper limit of its range of travel, and an additional separate member engaging said operating device and clampable by said nut to hold said device at the lower limit of its range of travel.

2. An automatic rail joint fastening comprising abutting rail sections, fishplates overlapping the joints thereof, bolts extending through said rails and fishplates, ratcheted nuts on said bolts, an operating device pivoted at one end for actuation of its free end through a limited vertical arc adjacent each of said nuts, a detent carried by the free end of said operating device for rotatively effective cooperation with the adjacent nut during downward travel of said device, resiliently yieldable means normally urging the free end of said device toward the upper limit of its range of travel, and an additional separate member controlled by the pressure of said nut and engaging said operating device to hold the latter at the lower limit of its range of travel.

3. In an automatic rail joint fastening, the combination of ratcheted nut members, operating devices independently pivoted at their ends adjacent each of said nut members for actuation of their free ends through limited vertical arcs, means carried by the free end of each of said devices adapted to engage and rotate the corresponding nut member, means normally urging the free end of each operating device toward the upper limit of its range of travel, and additional separate members engaging corresponding operating devices and controlled by pressure of their respective said nut members to hold said operating devices at the lower limit of their range of travel.

4. In a device of the character described, a rail joint including clamping bolts fitted with ratcheted nut members, operating devices independently pivoted adjacent their ends for actuation of their free ends through limited vertical arcs adjacent each of said nut members, ratchet detent means carried adjacent the free ends of each of said operating devices and yieldingly held in operative relation with the corresponding nut member, ratchet pawl means yieldingly engaging each nut member to prevent reverse rotation thereof, and a single expansive coil spring element in each operating device normally urging the latter toward the upper limit of its range of travel and simultaneously yieldingly positioning said detent and pawl.

5. In a device of the character described, a rail joint including clamping bolts fitted with ratcheted nut members, a washer clampable under each of said nut members, an arm projecting radially from each of said washers, operating devices independently pivoted for actuation through limited vertical arcs adjacent each of said nut members and each arranged to engage and tighten its respective nut member during its downward travel, resiliently yieldable means normally urging each said operating device toward the upper limit of its range of travel, a notch in each said operating device operatively engaged by the corresponding washer arm, whereby said device may be held adjacent the lower limit of its range of travel and an additional separate member engaging each operating device and clampable by the corresponding nut to hold said device against movement.

6. In a device of the character described, the combination with a rail joint having clamping bolts fitted with ratcheted nut members on the wheel flange side of said joint, of operating devices hinged adjacent their ends to said joint for independent arcuate travel of their free ends into and out of the path of wheel flanges, yieldable detent means carried by said devices operable to engage and rotate said nut members, yieldable pawl means arranged to prevent reverse rotation of said nut members, and a single expansive coil spring element arranged to urge each operating device toward the upper limit of its range of travel and simultaneously yieldingly position the detent and pawl elements thereof; together with an additional separate member engaging each said operating device and clampable under its respective nut to hold said device at the lower limit of its range of travel.

MICHAEL BETKE.